Dec. 22, 1959    H. C. ECKSTROM ET AL    2,918,355
METHOD FOR DETERMINING GAS-CATALYST CONTACTING EFFICIENCY
Filed July 14, 1955
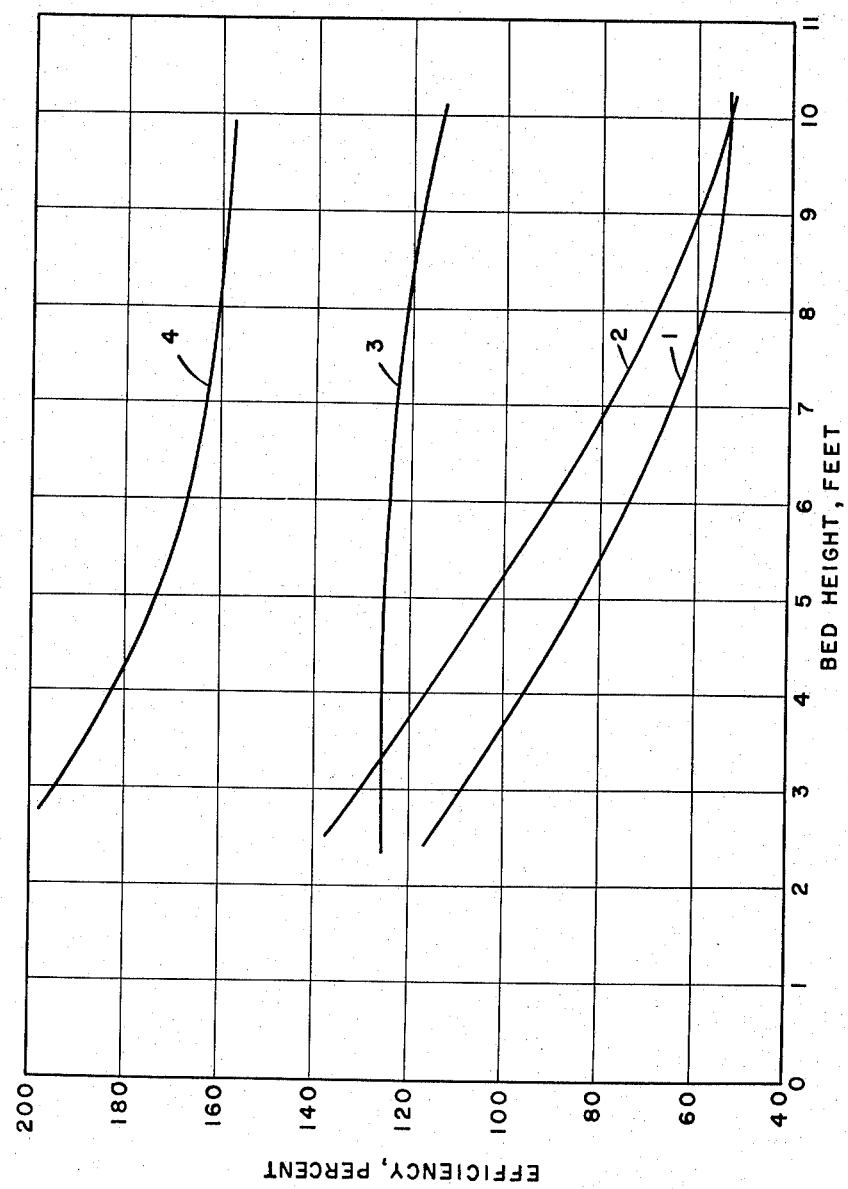
HARTLEY C. ECKSTROM
CLIFTON G. FRY
HAROLD L. PICKERING
ERIC L. TOLLEFSON
         INVENTORS
BY *Arthur M. McElroy*
         ATTORNEY

2,918,355
METHOD FOR DETERMINING GAS-CATALYST CONTACTING EFFICIENCY

Hartley C. Eckstrom, Clifton G. Frye, Harold L. Pickering, and Eric L. Tollefson, Tulsa, Okla., assignors to Pan American Petroleum Corporation, a corporation of Delaware Application July 14, 1955, Serial No. 522,142

12 Claims. (Cl. 23—230)

Our invention relates to a novel method for determining the efficiency with which gaseous reactants contact a catalytic surface. More particularly, it pertains to a method whereby such efficiency can be utilized in the design of commercial scale reactors in which various gaseous reactions are conducted in the presence of a catalyst.

In designing reactors for use in commercial operations, the commonly accepted procedure ordinarily is first to collect data relating to the particular reaction involved by means of small or bench scale experiments. Thereafter, the information gained from the bench scale work is used in the construction and operation of a suitable pilot plant where various characteristics of the reaction can be investigated in further detail. Next, a semicommercial unit may be designed which gives still further information regarding the reaction under investigation. At this stage of the development, a reasonably good idea of what the full size commercial operation is capable of doing may be realized. While the answer sought for in the way of reactor design is generally obtained by this method, such a procedure has many disadvantages, one of which is the fact that the actual reaction for which the equipment is to be designed must be carried out at every stage of development. Such reactions frequently require rather drastic conditions of temperature, pressure, catalyst handling, etc. Obviously, such requirements add materially to the cost of the ultimate design.

Accordingly, it is an object of our invention to provide a method for designing reactors and related equipment of the type employed in catalytically promoted gas phase reactions whereby a material savings in cost for procurement of the desired design can be realized. It is another object of our invention to provide a method for obtaining the necessary information to design equipment of the aforesaid type without having to effect the reaction involved under actual conditions in prototype apparatus. It is still another object of our invention to provide a method for obtaining the aforesaid information under mild conditions, e.g., room temperature (30° C.), and at atmospheric pressure using a gaseous material which is easily detected itself when present in small concentrations in gaseous mixtures and which readily decomposes into an unobjectionable component or components on contact with the catalytic surface under investigation. It is a further object of our invention to determine by the process thereof the type of internal design that a reactor should have regardless of whether or not the reaction itself is to be effected in an empty reactor whose surfaces are catalytic, in a fixed bed, or in a fluidized bed of catalyst.

In carrying out a preferred form of our invention, air or other suitable gas is mixed with a small quantity of ozone to give a final concentration of from about 0.02 to about 0.1 or 0.3 mol percent ozone. This mixture is then fed to the reactor containing the internals design being studied. The process may be and preferably is effected under ordinary conditions of temperature and pressure. As the ozone contacts the catalytic surface within the reactor, it decomposes into oxygen. The amount of unconverted ozone in the exit gas from the reactor can then be used to determine directly the efficiency with which the particular reactant gas or gases may be expected to contact the catalyst. Gases other than air may be employed with ozone, the only requirement being that they are substantially inert under the conditions of operation or do not form complicating by-products. An example of such a gas is nitrogen. For economic reasons, however, air is ordinarily preferred.

In applying the process of our invention to various reactor design studies, we have found that for reliable results the partial pressure of the water vapor in the feed gas should be kept as nearly constant as possible and preferably at a comparatively low concentration. This is desirable for the reason we have found that the activity of the catalyst decreases with increasing moisture content of the gas. Presumably, this decline in catalyst activity results from the fact that the presence of moisture on the catalyst surface reduces the number of active centers which serve to decompose the ozone. Regardless, however, of what the true cause of the moisture effect is, we generally prefer, in conducting our process, to control and maintain the moisture content of the gas at a relatively low level.

The above phenomenon leads to another valuable feature of our invention which is concerned with the ease in which studies can be conducted in a desired conversion range. Thus, if it is desired to investigate a particular reactor design operating at a conversion level of about 50 percent, adjustment of the moisture content of the feed gas to the proper concentration will ordinarily permit this object to be accomplished. In general, with respect to the moisture content of the gas employed, the concentration thereof may vary. For instance, with the studies which we have conducted in connection with iron mill scale catalyst, the moisture content of the gas was such as to give a dew point of from about 30° to about 31° F.

The manner in which analysis for ozone in the presence of air is carried out in performing the process of our invention may be based on a number of different techniques. In general, however, we prefer to employ the iodometric method for determining the ozone content of the tail gas from the unit under investigation. Briefly, this procedure involves running a portion of the tail gas through an alkaline or neutral solution of potassium or sodium iodide. Usually, a neutral iodide solution is preferable owing to the tendency of alkaline iodide solutions to favor the formation of hydrogen peroxide under the conditions employed. After absorption of the ozone, the iodide solution is acidified and liberated iodine titrated with standard sodium thiosulfate. As generally employed, this particular method of ozone analysis is capable of detecting ozone in concentrations of not less than about 2 parts per million. Further details regarding this, as well as other methods of analysis, may be obtained from any standard reference work such as, for example, "The Bibliography of Ozone Technology," volume 1, by Clark E. Thorp, published by Armour Research Foundation of Illinois Institute of Technology, Chicago, Illinois.

The process of our invention may be employed in determining which of a variety of catalyst particle sizes or shapes in fluidized systems is most efficient. Also, it may be used in connection with the design of three principal reactor systems: (1) reactors in which the catalytic action occurs on the surface of the reactor walls and/or reactor internals, (2) fixed bed units, and (3) fluidized systems. In studying any of these systems, the catalytic surface may be either relatively inactive with respect to the decomposition of ozone or it may be too reactive. For example, in the case of certain hydrocarbon cracking catalysts used in fluidized catalytic cracking, ozone does not readily decompose when contacted therewith, at least under mild conditions of operation. However, by impregnating the catalyst with metallic silver, platinum, palladium, or with oxides of such metals as manganese, cobalt, lead, etc., it can be made sufficiently active with respect to ozone decomposition to employ the process of our invention in determining the efficiency of a proposed catalytic cracking unit. Conversely, if the catalyst is overly active and leaves substantially no detectable quantity of ozone in the reactor tail gas, the catalyst activity may be destroyed with any of a number of gases which serve as poisons, such as for example, sulfur trioxide, hydrogen fluoride, hydrogen sulfide, and the like. The activity of the catalyst under study may then be brought back to the desired level by impregnation with one or more of the above-mentioned materials which promote the decomposition of ozone.

One of the outstanding advantages of the process of our invention resides in the fact that it may be effected under relatively mild conditions. By this, we mean that the efficiency of a given reactor design employing either an extended catalytic surface, a fixed bed of catalyst, or a fluidized bed of catalyst, can be ascertained without having to employ the sometimes drastic conditions of the actual operation for which the reactor is being designed. For example, it is unnecessary in determining the efficiency of a particular reactor design to reproduce the reaction condition of temperature. In studying the efficiency of different types of reactor internals designs, one set of internals may be substituted for another with a minimum of delay. The results obtained with small scale studies will show the relative efficiency of the different internals designs, after which only the most promising thereof need to be studied in investigations conducted on a larger scale.

A further advantage of our invention resides in the selection of ozone as a medium by which the efficiency of a given reactor design can be determined. Under conditions of operation, ozone decomposes into oxygen which in no way interferes with the appearance or physical operation, e.g., fluidization, of the catalyst. There are no undesirable by-products produced which would tend in any way to alter the operating efficiency of the system.

For a better understanding of our invention, reference is made to the following runs which were performed and the results thereof which are plotted on the accompanying graph. In the runs referred to, air was mixed with a small amount of ozone. This mixture was then fed into a cylindrical reactor 15 feet high and 30 inches in diameter containing varying amounts of iron mill scale catalyst. The tail gas from the particular reaction design under investigation was then analyzed in accordance with the method generally outlined above and the efficiency of the reactor established by determining the percentage of the original ozone converted into oxygen.

In all runs, the following conditions were employed:

Air dew point (@ 14.4 p.s.i.a.) _____ °F__ 31.1
Inlet temperature to reactor _____ °F__ 85
Reactor exit temperature _____ °F__ 85
Percent ozone in feed gas _____ 0.028–0.032

In run No. 1, the grid employed in the reactor had 62 holes ⅛ inch in diameter and equally spaced from one another. No reactor internals were used in this particular run.

Table I

| Test No. | Linear Velocity, Feet per Second | Flow Rates, s.c.f.h. | | Bed Height, Feet | Iron Mill Scale Catalyst in Reactor, Pounds |
|---|---|---|---|---|---|
| | | $O_2$ | Air | | |
| 5A | 0.30 | 37 | 5,120 | No catalyst | 0 |
| 5B | 0.20 | 24 | 3,410 | 10 | 7,800 |
| 5B | 0.30 | 37 | 5,120 | 10 | 7,800 |
| 5B | 0.50 | 61 | 8,530 | 10 | 7,800 |
| 5C | 0.20 | 24 | 3,410 | 6 | 4,680 |
| 5C | 0.30 | 37 | 5,120 | 6 | 4,680 |
| 5C | 0.50 | 61 | 8,530 | 6 | 4,680 |
| 5D | 0.20 | 24 | 3,410 | 3 | 2,340 |
| 5D | 0.30 | 37 | 5,120 | 3 | 2,340 |
| 5D | 0.50 | 61 | 8,530 | 3 | 2,340 |

Run No. 2 involved the use of the same grid as was used in the previous run; however, in addition, 26 vertical tubes 15 feet in length and 2 inches O.D. were arranged on the grid in a triangular pattern with the distance between the tubes being 5 inches center-to-center. The arrangement of the tubes was such that a grid hole appeared in the center of each group of 3 tubes. Conditions employed in this run are shown in the table below:

Table II

| Test No. | Linear Velocity, Feet per Second | Flow Rates, s.c.f.h. | | Bed Height, Feet | Iron Mill Scale Catalyst in Reactor, Pounds |
|---|---|---|---|---|---|
| | | $O_2$ | Air | | |
| 1B | 0.20 | 24 | 3,410 | 10 | 6,850 |
| 1B | 0.30 | 37 | 5,120 | 10 | 6,850 |
| 1B | 0.50 | 61 | 8,530 | 10 | 6,850 |
| 1C | 0.20 | 24 | 3,410 | 6 | 4,100 |
| 1C | 0.30 | 37 | 5,120 | 6 | 4,100 |
| 1C | 0.50 | 61 | 8,530 | 6 | 4,100 |
| 1D | 0.20 | 24 | 3,460 | 3 | 2,050 |
| 1D | 0.30 | 37 | 5,120 | 3 | 2,050 |
| 1D | 0.50 | 61 | 8,530 | 3 | 2,050 |

In run No. 3, 7 hexagonally-shaped compartments 9½ feet high, the lower ends thereof being 6 inches above the grid, were built around 12 1½-inch O.D. vertical tubes 15 feet in length, arranged in a triangular pattern on 8½-inch centers. The grid employed had 28 holes ⁹⁄₆₄ inch in diameter. These holes were arranged so that there were 4 to each compartment. The conditions under which this run was carried out were as follows:

Table III

| Test No. | Linear Velocity, Feet per Second | Flow Rates, s.c.f.h. | | Bed Height, Feet | Iron Mill Scale Catalyst in Reactor, Pounds |
|---|---|---|---|---|---|
| | | $O_2$ | Air | | |
| 17A | 0.30 | 21 | 2,940 | 0 | 0 |
| 17B | 0.20 | 14 | 1,955 | 3 | 1,340 |
| 17B | 0.30 | 21 | 2,940 | 3 | 1,340 |
| 17B | 0.50 | 35 | 4,890 | 3 | 1,340 |
| 17B | 0.65 | 46 | 6,350 | 3 | 1,340 |
| 17C | 0.20 | 14 | 1,955 | 6 | 2,680 |
| 17C | 0.30 | 21 | 2,940 | 6 | 2,680 |
| 17C | 0.50 | 35 | 4,890 | 6 | 2,680 |
| 17C | 0.65 | 46 | 6,350 | 6 | 2,680 |
| 17D | 0.20 | 14 | 1,955 | 8 | 3,570 |
| 17D | 0.30 | 21 | 2,940 | 8 | 3,570 |
| 17D | 0.50 | 35 | 4,890 | 8 | 3,570 |
| 17D | 0.65 | 46 | 6,350 | 8 | 3,570 |
| 17E | 0.20 | 14 | 1,955 | 10 | 4,460 |
| 17E | 0.30 | 21 | 2,940 | 10 | 4,460 |
| 17E | 0.50 | 35 | 4,890 | 10 | 4,460 |
| 17E | 0.65 | 46 | 6,350 | 10 | 4,460 |

In run No. 4, a grid having 52 holes ⅛-inch in diameter was employed. In this particular run, tubes were placed horizontally in the form of vertically spaced groups, or trays. Each tray of cross members or tubes consisted of 5 2-inch O.D. tubes spaced 5 inches apart. There were 27 of these trays vertically spaced 4⅜ inches apart (center-to-center) to give an overall height of 10 feet. The trays were arranged so that the tubes therein were offset from those in the adjacent tray or trays. The above reactor internals design was studied under the following conditions:

Table IV

| Test No. | Linear Velocity, Feet per Second | Flow Rates, s.c.f.h. | | Bed Height, Feet | Iron Mill Scale Catalyst in Reactor, Pounds |
|---|---|---|---|---|---|
| | | $O_2$ | Air | | |
| 7A | 0.30 | 37 | 5,120 | No catalyst | 0 |
| 7B | 0.20 | 24 | 3,410 | 10 | 6,850 |
| 7B | 0.30 | 37 | 5,120 | 10 | 6,850 |
| 7B | 0.50 | 61 | 8,530 | 10 | 6,850 |
| 7C | 0.20 | 24 | 3,410 | 6 | 4,100 |
| 7C | 0.30 | 37 | 5,120 | 6 | 4,100 |
| 7C | 0.50 | 61 | 8,530 | 6 | 4,100 |
| 7D | 0.20 | 24 | 3,410 | 3 | 2,050 |
| 7D | 0.30 | 37 | 5,120 | 3 | 2,050 |
| 7D | 0.50 | 61 | 8,530 | 3 | 2,050 |

In all cases, the effluent obtained employing a given reactor design was analyzed for ozone content. The curves shown in the accompanying graph are based on an average of the range of velocities employed in the above runs, i.e., 0.2, 0.3 and 0.5 foot per second. This demonstrates very clearly the manner in which our invention may be used to determine, from a number of different reactor internals designs, the best or most efficient of the group.

From the curves presented, using as a reference curve 1, which is based upon results obtains from run No. 1 and showing an efficiency of 100 percent at a bed height of 3.75 feet, it is seen that, at the same bed height, substantially higher conversions of ozone to oxygen were obtained in the case of run Nos. 2, 3 and 4, represented by curves 2, 3 and 4. Stated in another manner, it will be seen that less catalyst was required with reactors employing internals to achieve the same efficiency (conversion) secured in the empty reactor run No. 1.

Although we have indicated the use of ozone in small concentrations to be desirable, it will be readily apparent to those skilled in the art that the process of our invention is not limited thereto. Actually, the quantity of ozone employed in any particular test stream will depend, at least partially, on the sensitivity of the ozone analysis used. Likewise, the temperature at which our process is carried out may vary over a relatively wide range. For any given set of operating conditions, the temperature should be held at a level such that appreciable but not complete conversion of the ozone to oxygen is obtained, thus leaving ozone in analytically measurable amounts in the gaseous effluent. In this regard, we have found that, at a given moisture concentration, the decomposition rate of ozone increases with increasing temperature. Also, the partilular temperature employed when using a given catalyst may depend on the sensitivity of the method of ozone analysis that is used. Ordinarily, we prefer to operate over a temperature range of from about 75° to about 120° F. The reaction involved in the process of our invention, in general, may be said to be relatively insensitive to total pressure at constant water concentration and, as a result, such pressure may vary widely. This characteristic of our process, however, may be employed to advantage inasmuch as it permits one to evaluate the effect of total pressure on gas-solids contacting efficiency.

While we have used the process of our invention principally for the purpose of evaluating the efficiency of various hydrocarbon synthesis reactor designs, we wish to emphasize the fact that the fundamental features of our invention may be used in determining the most efficient reactor design for substantially any type of system in which a gaseous mixture reacts in the presence of a catalyst surface. In determining the efficiency of any such reactor, our invention contemplates contacting a catalytic surface thereof with ozone to at least partially decompose the latter and determining the residual ozone content of said gaseous mixture.

We claim:

1. In a method for determining the extent to which a gaseous reaction mixture contacts a catalytic surface within a reaction zone, said surface being active to decompose ozone, the improvement which comprises contacting said surface with a gas comprising ozone whereby the latter is partially decomposed into free oxygen under conditions of substantially constant temperature, maintaining the moisture content of said gas at a relatively constant level, and determining the residual ozone in the resulting gaseous mixture.

2. The process of claim 1 in which said gas comprises a mixture of air and ozone.

3. In a method for determining the extent to which a gaseous reaction mixture contacts a catalytic surface within a reaction zone, said surface being active to decompose ozone, the improvement which comprises contacting said surface with a gas comprising air and ozone in which the ozone content thereof ranges from about .02 to about 0.3 mole percent and wherein the moisture content of said gas remains at a substantially constant level, allowing the ozone present in said gas to partially decompose into free oxygen under conditions of substantially constant temperature, collecting a portion of the resulting gaseous mixture and determining the residual ozone in said gaseous mixture.

4. In a method for determining the extent to which a gaseous reaction mixture contacts a catalytic surface, the improvement which comprises rendering inactive a catalyst which readily decomposes ozone, thereafter bringing back the activity of the catalyst to a level less than its original level of activity by impregnating said inactive catalyst with a known ozone decomposition catalyst, thereafter contacting the resulting catalyst with a gas containing ozone in which the moisture content of said gas remains at a substantially constant level, allowing the ozone present in said gas to partially decompose into free oxygen, and determining the residual ozone in the resulting gaseous mixture.

5. In a method for determining the extent to which a gaseous reaction mixture contacts a catalytic surface within a given reaction zone, the surface of which does not tend to promote the decomposition of ozone to oxygen, the improvement which comprises rendering said surface active to decompose ozone by contasting said surface with a known ozone decomposition catalyst, thereafter contacting the resulting activated surface with a gaseous mixture containing a minor portion of ozone, wherein the moisture content of said gas remains at a substantially constant level, said known ozone decomposition catalyst being applied to said surface in a concentration effective to cause only partial decomposition of said ozone, allowing the ozone present in said gas to partially decompose into free oxygen, and determining the residual ozone in the resulting gaseous mixture.

6. In a method for determining the extent to which a gaseous reaction mixture contacts a fixed bed of catalyst within a given reaction zone, said catalyst being active to decompose ozone, the improvement which comprises contacting said fixed bed of catalyst with a gaseous mixture comprising a minor portion of ozone, the moisture content of said gaseous mixture being maintained at a substantially constant level, whereby said ozone is partially decomposed into free oxygen under conditions of substantially constant temperature, and determining the residual ozone in the resulting gaseous mixture.

7. In a method for determining the extent to which a gaseous reaction mixture contacts a fluidized bed of catalyst within a given reaction zone, said catalyst being active to decompose ozone, the improvement which comprises contacting said fluidized bed of catalyst with a gaseous mixture comprising a minor portion of ozone, the moisture content of said gaseous mixture being maintained at a substantially constant level, whereby said ozone is partially decomposed into free oxygen under conditions of substantially constant temperature, and determining the residual ozone in the resulting gaseous mixture.

8. In a method for determining the extent to which a gaseous reaction mixture contacts a fluidized bed of catalyst within a given reaction zone, said catalyst being active to decompose ozone, the improvement which comprises contacting said fluidized bed of catalyst with a gaseous mixture comprising a major portion of air and a minor portion of ozone, the moisture content of said gaseous mixture being such as to give a dew point of between about 30° and 31° F. at atmospheric pressure, whereby said ozone is partially decomposed into free oxygen, and determining the residual ozone in the resulting gaseous mixture.

9. The process of claim 8 in which the catalyst is iron mill scale.

10. In a method for determining the extent to which a gaseous reaction mixture contacts a catalytic surface within a reaction zone, said surface being active to decompose ozone, the improvement which comprises contacting said surface with a gas comprising air and ozone wherein the moisture content of said gas remains at a substantially constant level and is such as to give a dew point of between about 30° and 31° F., whereby said ozone is partially decomposed into free oxygen and determining the residual ozone in the resulting gaseous mixture.

11. In a method for determining the extent to which a gaseous reaction mixture contacts a catalytic surface active to decompose ozone, the improvement which comprises contacting said surface with ozone whereby the latter is only partially decomposed into free oxygen, maintaining the moisture content of said ozone at a relatively constant level and determining the residual ozone in the resulting gaseous mixture.

12. In a method for determining the extent to which a gaseous reaction mixture contacts a catalytic surface within a reaction zone, said surface being active to decompose ozone, the improvement which comprises contacting said surface with a gas containing ozone whereby the latter is partially decomposed into free oxygen at substantially atmospheric temperature, maintaining the moisture content of said gas at a relatively constant level, and determining the residual ozone in the resulting gaseous mixture.

References Cited in the file of this patent

UNITED STATES PATENTS

| | | |
|---|---|---|
| 1,961,878 | Gilkey | June 5, 1934 |
| 2,260,821 | Bendy | Oct. 28, 1941 |
| 2,417,321 | Park et al. | Mar. 11, 1947 |
| 2,582,885 | Rosenblatt | Jan. 15, 1952 |
| 2,603,608 | Lewis et al. | July 15, 1952 |

OTHER REFERENCES

Wheeler: "Advances in Catalysis," vol. III, 1951, pp. 260–275.

Thorp: "Bibliography of Ozone Tech.," vol. I, May 1, 1954, pp. 24–26.